INVENTOR
Anatolijus Jazbutis
Richard T. Swanson

BY Strauch, Nolan & Neale
ATTORNEYS

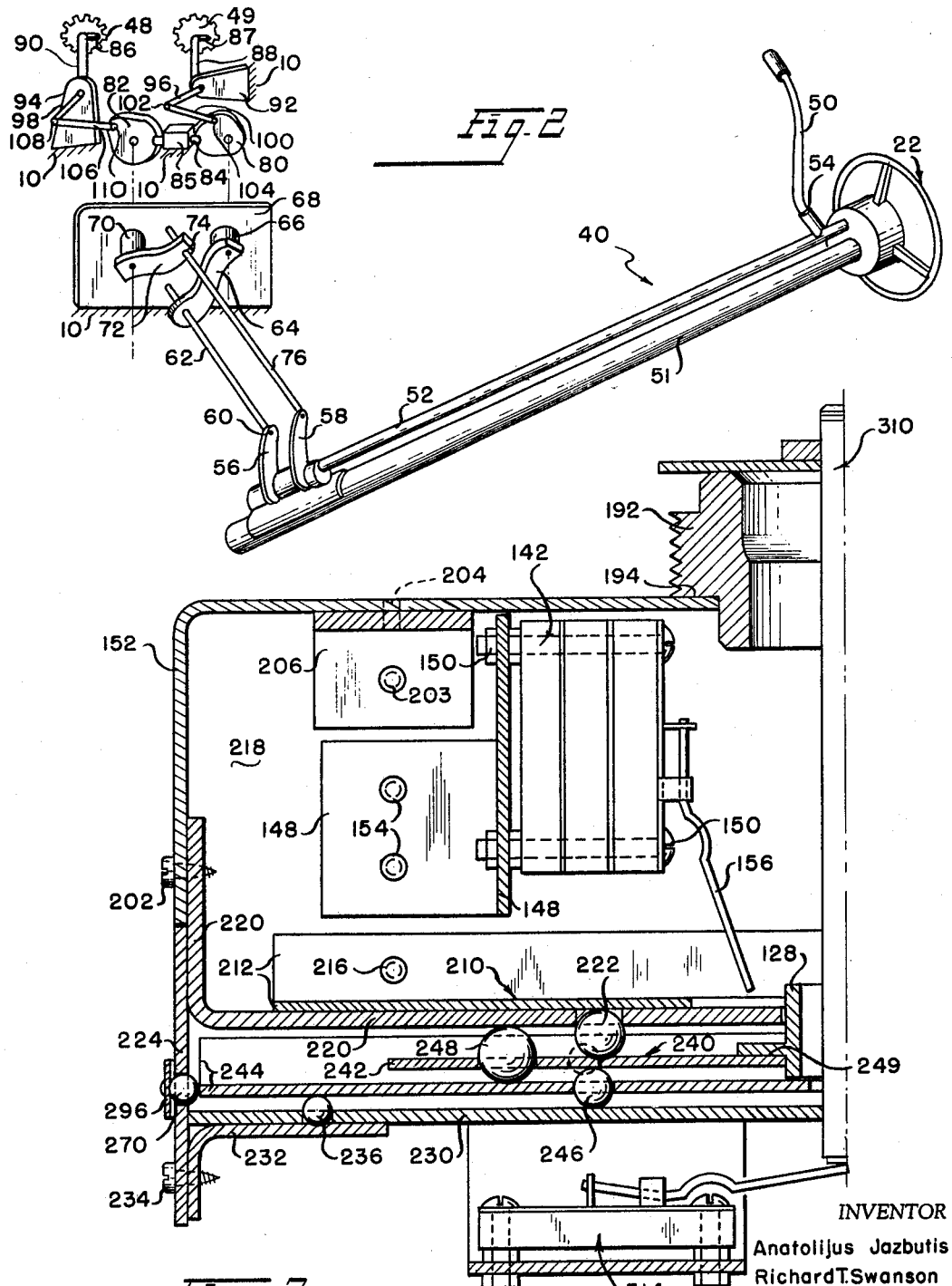

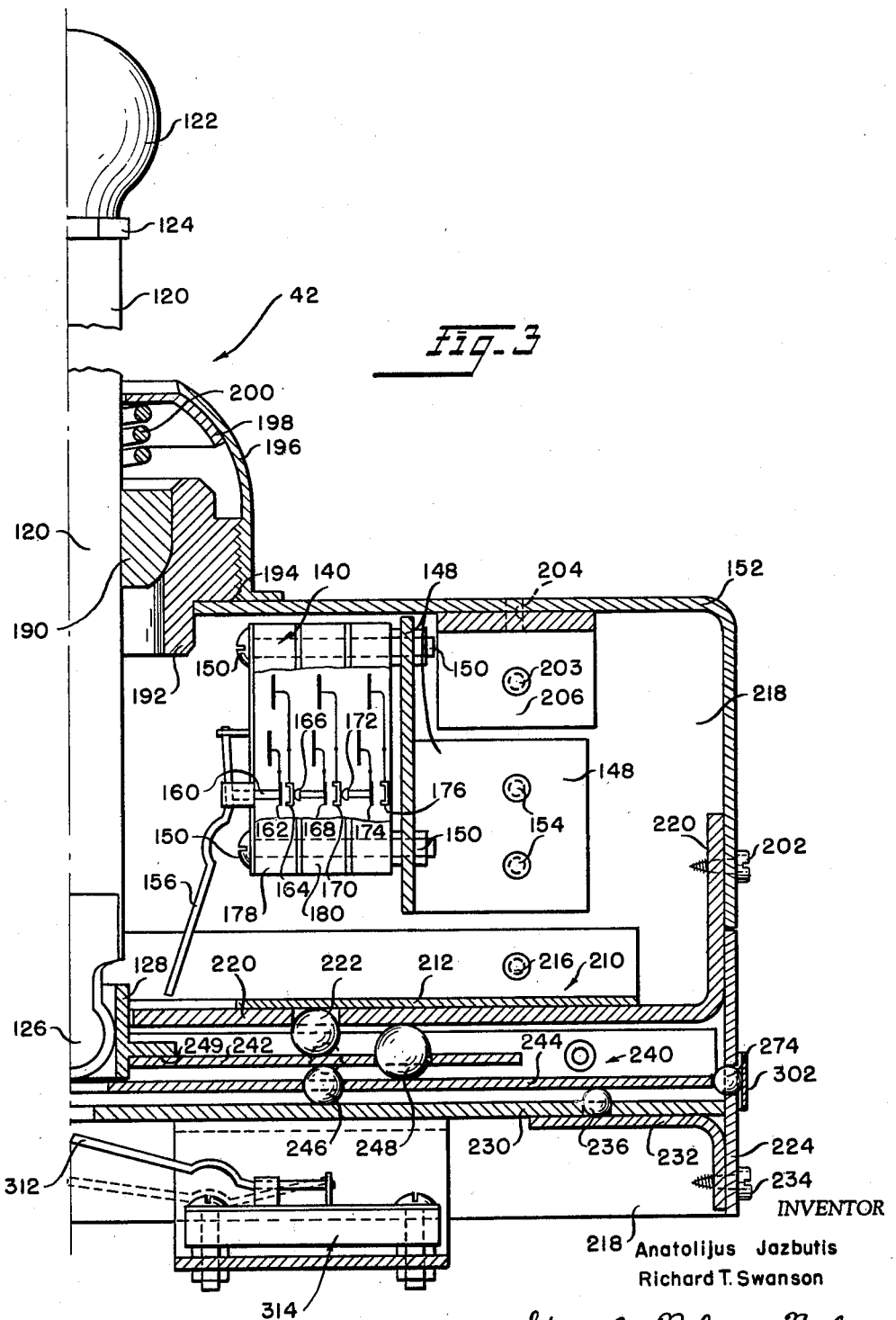

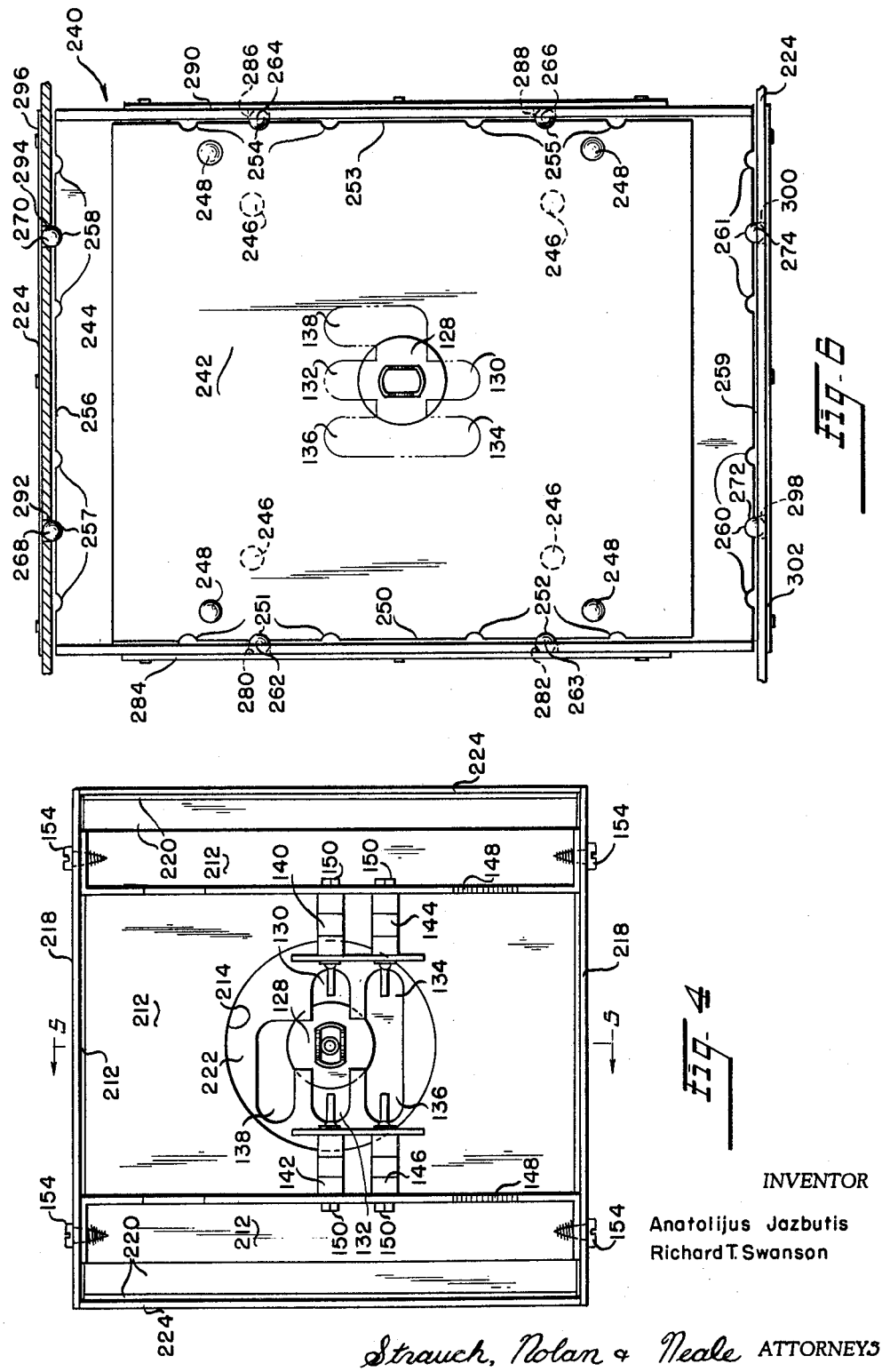

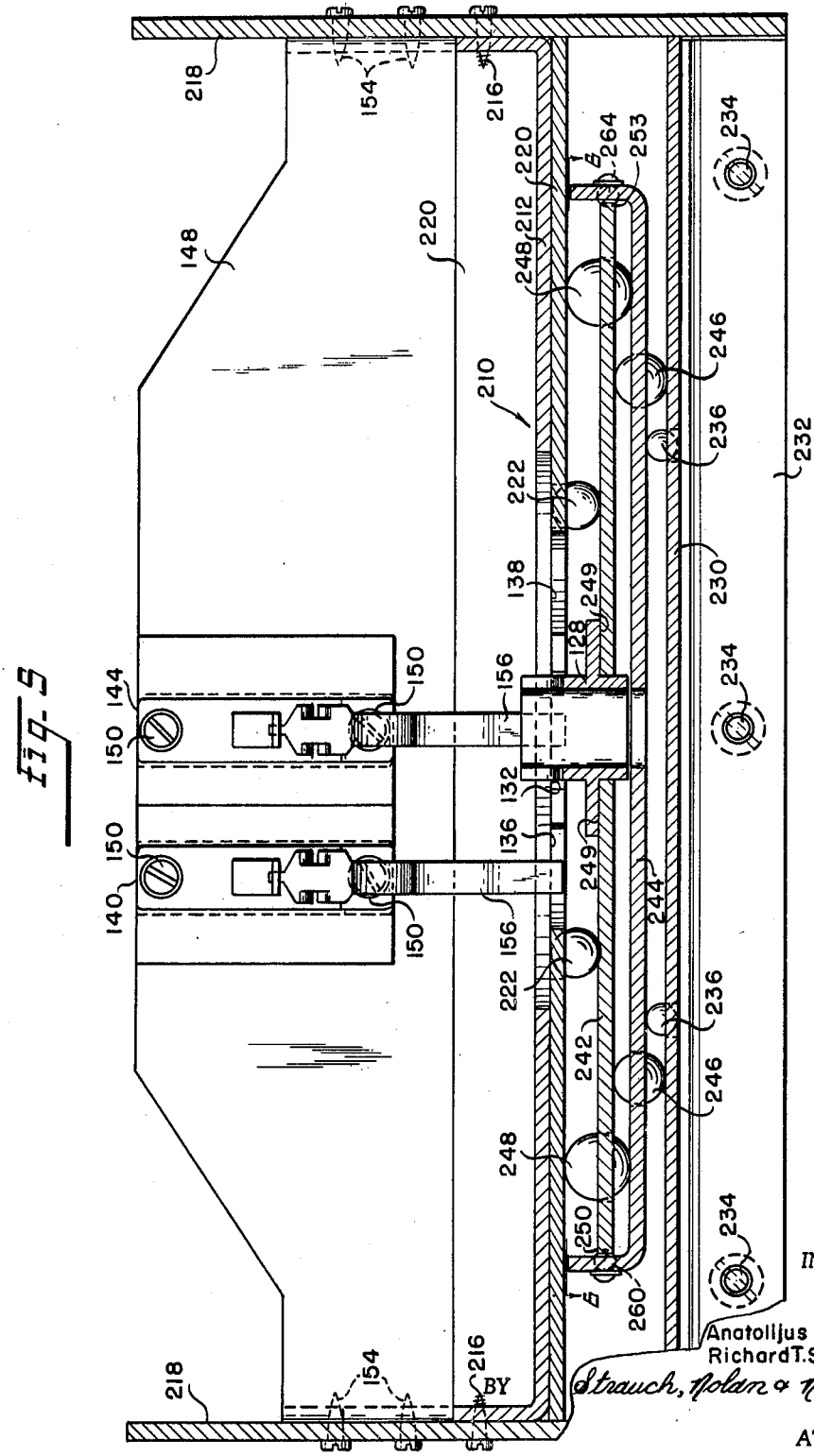

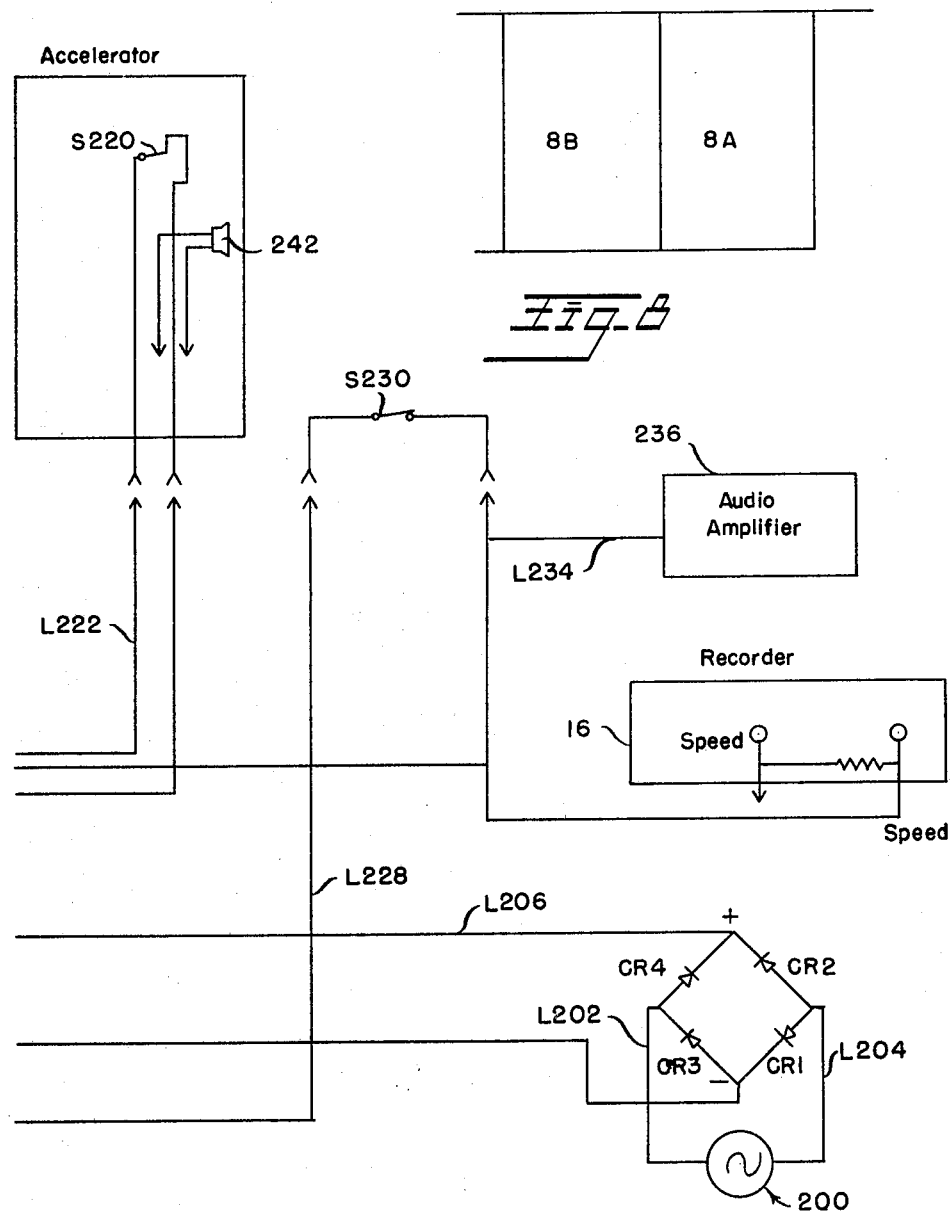

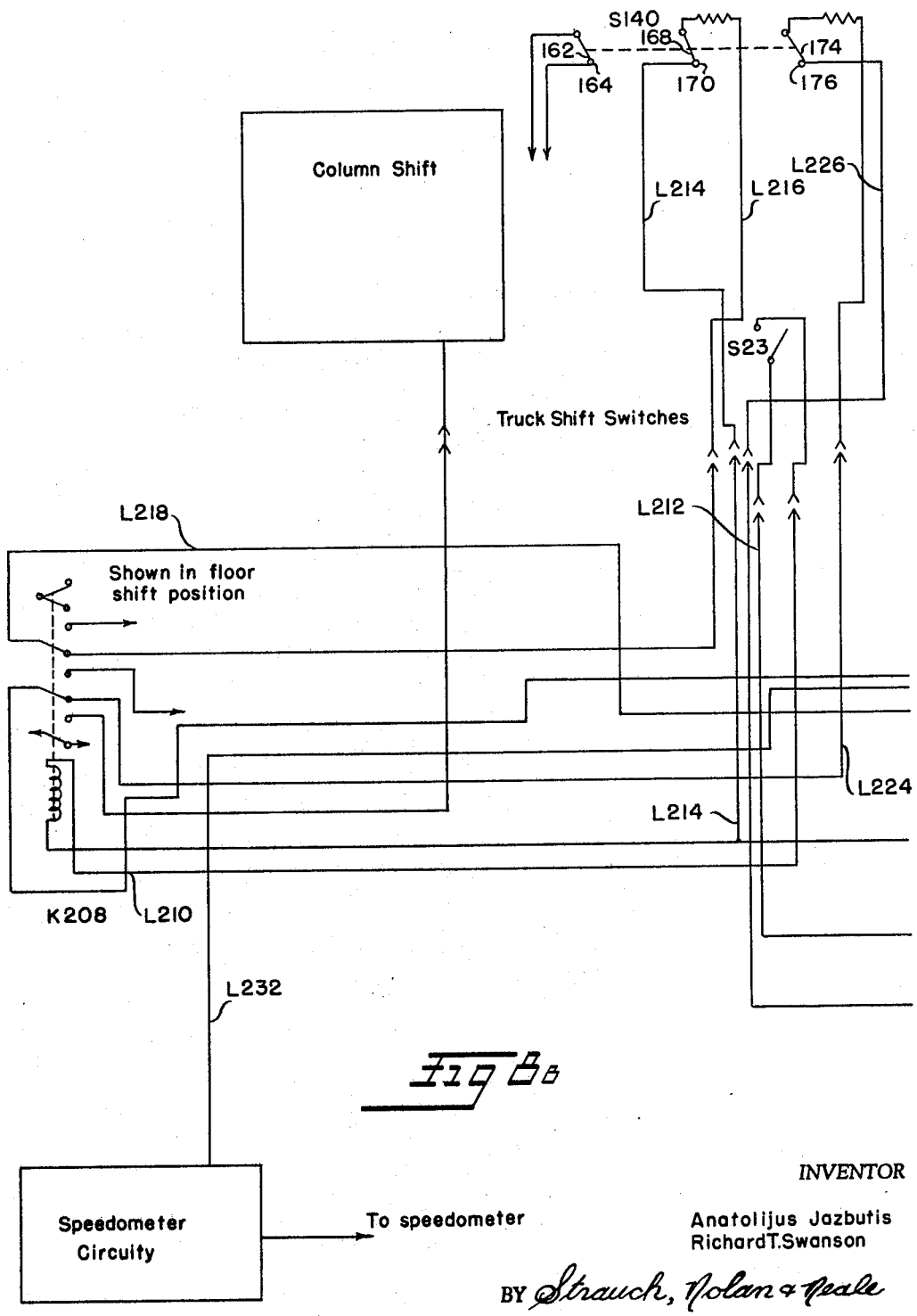

United States Patent Office 3,478,442
Patented Nov. 18, 1969

3,478,442
SIMULATOR
Anatolijus Jazbutis, Syracuse, and Richard T. Swanson, Lakewood, N.Y., assignors, by mesne assignments, to Aetna Casualty and Surety Company, a corporation of Connecticut
Filed Nov. 21, 1963, Ser. No. 325,257
The portion of the term of the patent subsequent to Nov. 18, 1983, has been disclaimed
Int. Cl. G09b 9/02
U.S. Cl. 35—11           8 Claims

ABSTRACT OF THE DISCLOSURE

The invention disclosed herein provides a novel means by which an operator of an automotive vehicle simulator can be tested. The simulator is equipped with two types of gearshifts, one is mounted on the steering column and the other is mounted on the floor. Conversion from one to the other can be quickly and efficably accomplished. The two types of gearshifts are adapted to develop response signals which are functionally indicative of the correctness of the gearshift manipulation by the operator.

---

The present invention is an improvement of Ser. No. 196,290, filed May 21, 1962 now Patent No. 3,251,142 and relates generally to dirigible wheeled vehicle simulators and, more particularly, to devices for driver training and/or evaluating, under simulated conditions, the driving ability of an automotive vehicle operator.

More specifically, the present inventive improvement relates to the provision in dirigible wheeled vehicle simulators of optional gearshift mechanisms permitting selective life-like simulation of either steering column gearshifting or floor gearshifting so that a given simulator can be used without significant time consuming or expensive alteration to train and evaluate drivers and prospective drivers utilizing a simulated gearshift of the type which will be found in the type of vehicle the driver will be expected to operate.

Devices of the type to which the present invention relates are useful in evaluating the skills and attitudes of drivers, license applicants and prospective employees for positions requiring driving ability. For these purposes, particularly the latter where one is attempting to evaluate the efficiency and attitude of an accomplished driver, it is important to give the person under evaluation as much of a feeling of realism as is practical while maintaining the expense of the equipment acceptably low.

For this purpose, the present invention provides driver evaluating apparatus in which a simulated vehicle is positioned in front of a relatively wide screen upon which is projected a varying scene depicting a typical sequence of events encountered while driving. The simulated vehicle is mounted for pivotal motion with respect to the screen in response to steering action by the drivers and the rate of presentation of the scene is normally varied in response to actuation of the accelerator pedal by the operator. Reference may be made to Ser. No. 196,290 for more introductory detail of the simulated vehicle apparatus as a whole and for the novel features of distinction over the prior art.

Summarily, the present invention provides driver evaluating apparatus, including a simulated vehicle equipped with conventional controls and quickly convertible between steering column mounted and floor mounted gearshifts as required and a projector for displaying a road scene at a rate which is normally varied in response to actuation of vehicle accelerator pedal by the operator.

The objects of the present invention include:

(1) The provision of improved alternately employable manual gearshifts for evaluating the gearshifting ability of an automotive vehicle operator;

(2) The provision of economically improved equipment for evaluating gearshifting ability which will impart to the driver being tested a realistic gearshift feeling of either steering column or floor gearshift manipulation, and which can be easily converted from one to the other as desired with the non-elected shift being rendered inoperative to avoid confusing the driver; and (3) The provision of an alternately employable floor shift simulating device which can be added to existing vehicle operation simulators with only negligible modification of the existing equipment.

Other objects and further novel features of the present invention will become fully apparent from the appended claims and the ensuing detailed description and discussion taken in conjunction with the accompanying drawings, in which:

FIGURE 2 is a diagrammatic illustration of the automobile's steering column gearshift and gearshift position sensing mechanism;

FIGURE 3 is a vertical section through one-half of the automobile's substantially symmetrical floor gearshift showing the shifting mechanism, the shiftable and non-shiftable internal mechanisms, the area of permissible relative movement therebetween in the gear engaging directions, and one of the position sensing switch mechanisms;

FIGURE 4 is a plan view of the floor shift with the central shifting mechanism and knob removed to illustrate the gear positions and position sensing switch mechanisms adaptable for either 3 or 4 speed transmission simulation;

FIGURE 5 is a vertical section view through the floor shift taken along line 5—5 of FIGURE 4 and illustrates the area of permissible relative movement between the internal shiftable and non-shiftable mechanisms within the limits of the neutral range;

FIGURE 6 is an internal plan view of the floor gearshift taken along line 6—6 of FIGURE 5, showing both the neutral range direction and gear engaging direction detent shiftable mechanisms;

FIGURE 7 is similar to FIGURE 3 showing the floor gearshift in the inoperative configuration with the central shifting mechanism being replaced by a plate and rod assembly; and FIGURES 8A and 8B, taken together as shown in FIGURE 8, constitute a simplified schematic diagram of the electrical portion of the novel convertible shift mechanism provided by the present invention.

GENERAL

Figure 1:
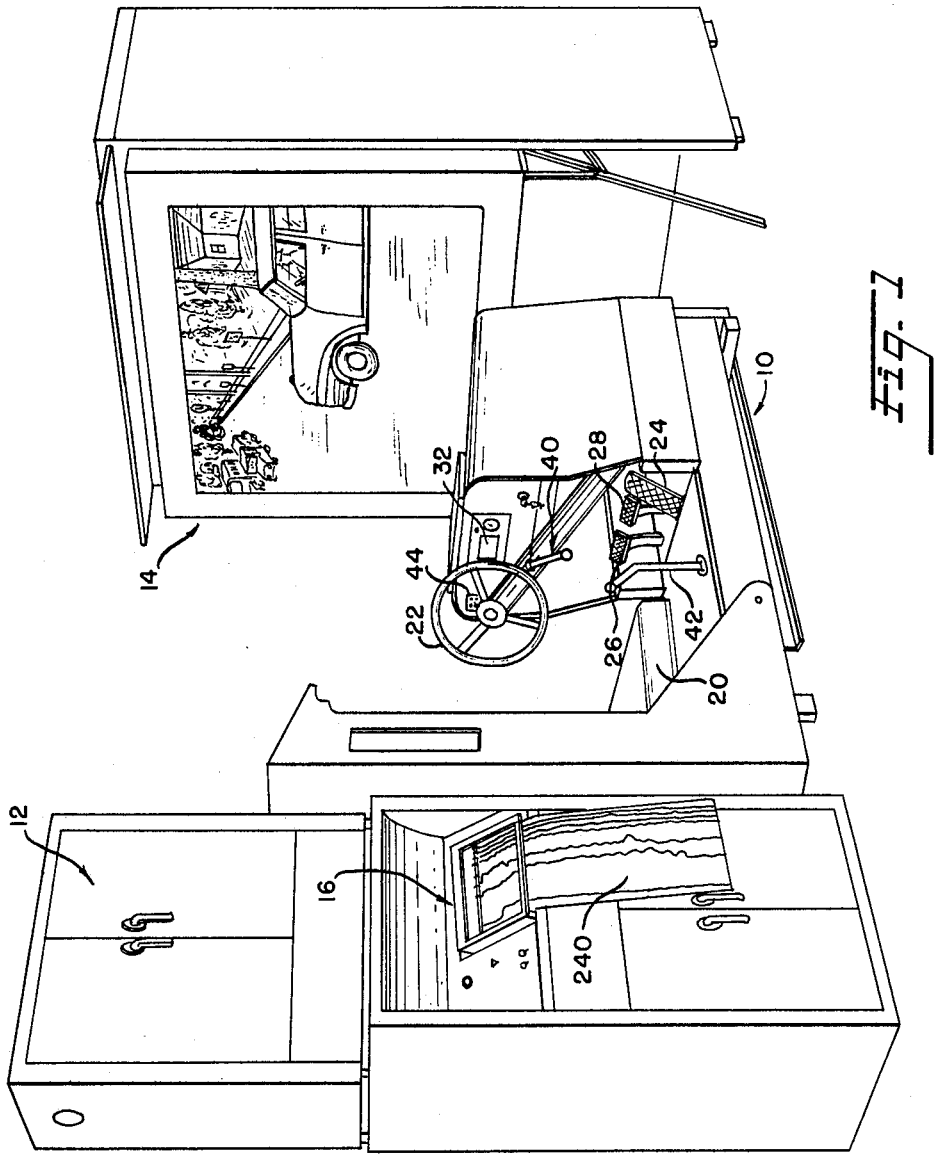
FIGURE 1 is a perspective view of a vehicle operation simulator employing the present invention.

Referring now to FIGURE 1, the novel simulated vehicle system provided by the present invention includes a simulated vehicle 10, an enclosed motion picture film projector 12, a screen 14, and an encased strip chart recorder 16. For details as to the preferred types of vehicle, projector, scene and chart recorders and their individual and combined functions, reference may be made to application No. 196,290 filed May 21, 1962.

Simulated vehicle 10 is equipped with a seat 20 and conventional operator-actuated vehicle controls such as steering wheel 22, accelerator 24, clutch pedal 26, brake pedal 28 and standard dashboard equipment and instrumentation, as for example ignition switch 30 and speedometer 32. Vehicle 10 also novelly includes steering column mounted simulated gearshift mechanism 40 and floor mounted simulated gearshift mechanism 42. Either gearshift mechanism may be utilized depending on the type of vehicle for which the driver is being trained or evaluated. (Most standard sized automobiles and small trucks use column mounted gearshifts, whereas sports cars, small imported automobiles, and heavy-duty trucks are normally equipped with floor mounted gearshifts.) The shift lever of the shift mechanism not being used may be quickly removed as hereinafter explained, to avoid confusion to the driver.

Button cluster 44 and a circuit described in detail in application No. 196,290, are provided for simulating operation of an automatic transmission.

GEARSHIFT MECHANISMS—MECHANICAL

Shift mechanisms 40 and 42 are electrically connected to speedometer 32 and co-operate with accelerator 24 and the speedometer circuitry to provide a simulated speedometer operation. The manner in which this is done is explained in copending application No. 95,538 filed March 6, 1961 now U.S. Patent No. 315,864, by Anatolijus Jazbutis to which reference may be had, if desired.

Shift mechanisms 40 and 42 are also electrically coupled to recorder 16 in a manner explained in copending application No. 196,290 and co-operate with accelerator 24 to produce a permanent record of the simulated speeds attained by the vehicle operator.

Steering column mounted gearshift mechanism 40, along with associated linkage and the switch arms of two "two-deck" switches 48 and 49 controlled by the gearshift mechanism, is illustrated in FIGURE 3. The gearshift lever 50 employed in mechanism 40, is of conventional construction and is removably mounted alongside steering column 51 in cylindrical housing 52, at 54, as by threads. Shift lever 50 is preferably removed when floor shift simulation is employed to avoid confusion of the driver.

Lever 50 may be moved through a path corresponding to the letter H to simulate the standard 3 speed shifting operation from neutral to first, second and third gears and also into reverse gear. Four speed simulated shift apparatus may also be used at this position. Gearshift lever 50 is coupled through a conventional ball and socket connection to a control rod (not shown) in housing 52. At its lower end, the control rod is selectively engageable with one of a pair of pivotally mounted cranks 56 or 58. When the driver pulls lever 50 toward his body to shift into low or reverse gears from neutral, the control rod is fixed to pivotal crank 58. Similarly, when lever 50 is moved away from the operator's body to shift the simulated vehicle from neutral into second (intermediate) or third (high) gear, the control rod is operatively connected to crank 56.

Crank 56 is pivotally connected at one end by pivot pin 60 to reciprocable rod 62 which in turn is fixed to the free end of crank 64. Crank 64 is fixed to the end of a shaft 66 supported in suitable bearings (not shown) in a bracket 68 fixed to the simulated vehicle body 10. Also rotatably journalled in bracket 68 parallel to shaft 86, by suitable bearings (not shown), is a similar shaft 70. Fixed to the end of shaft 70 is a crank 72 pivotally connected at 74 to rod 76. Rod 76 is connected to the free end of crank 58 in the same manner that rod 62 is connected to crank 56. Thus, manipulation of gear lever 50 is effective to rotate shaft 70 if the gear actuator control rod is connected to crank 58 and, alternatively, shaft 66 if the gear-actuator control rod is connected to crank 56.

On the ends opposite cranks 64 and 72, shafts 66 and 70 mount cams 80 and 82 provided with a double-ended cam follower 84 reciprocably mounted in a support 85 fastened to simulator body 10. Cams 80 and 82, cam follower 84, bracket 68, shafts 66 and 70, and levers 64 and 72 are all standard Ford parts in the illustrated embodiment of the present invention.

Only the wafers or switch arms 86 and 87 are shown in FIGURE 2. These switch arms are fixed to shafts 88 and 90 which are rotatably mounted in suitable bearings (not shown) in brackets 92 and 94 mounted on the simulated vehicle body 10. Fixed to the ends of shafts 88 and 90 opposite switch arms 83 are cranks 96 and 98. Crank 96 is connected to the periphery of cam 80 by a connecting link 100 pivoted at 102 to the free end of crank 96 and at 104 adjacent the periphery of the cam. Crank 98 is similarly connected adjacent the periphery of cam 82 by a connecting link 106 pivoted at 108 to the free end of the crank and at 110 adjacent the periphery of the cam. Thus, the rotation of cam 80 or 82 is effective to pivot shaft 88 or 90 to transfer the associated gear switch arm 86 or 87 from one to another of a plurality of gear switch contacts so that accurate or faulty gear engagement may be detected as explained in copending application No. 196,290.

Bracket 68 and the components mounted on it form a compact gearshift unit which may be readily assembled in simulated vehicle 10 by bolting bracket 68 to vehicle body 10 and fixing rods 62 and 76 to cranks 64 and 72.

While a rotatable type simulated gearshift assembly has been described with respect to shift 40, it is apparent that non-rotatable types of simulated gearshift assemblies may be used at the base of column 51, as for example, the planar motion type assembly to be described subsequently in conjunction with shift mechanism 42.

The electrical circuitry 91 associated with gearshift mechanism 40 is shown in black box form in FIGURE 8B. The nature of this circuitry and its function are described in detail in copending applications 196,290 and 93,538, to which reference may be had if desired.

One symmetrical half of the novel simulated floor mounted gearshift mechanism 42 is shown in FIGURE 3. Shift mechanism 42 includes a shift lever 120, shiftable means including force receiving and transmitting socket 128, simulated gear positions 130, 132, 134, 135 and 138 (FIGURE 4), electrical switches (e.g., 140) and associated circuitry (FIGURE 8) responsive to manipulation of socket 128 and out of the gear positions.

Shift lever 120 is of standard construction with a knob 122 secured at one end by jam nut 124 and a ball 126, which is engaged in socket 128, at the other end. Driver manipulation of shift lever 120, acting through ball 126, operatively positions socket 128 in the desired simulated gear position. For example, in FIGURE 4, where shift lever 120 and the cover plate are removed for purposes of clarity, socket 128 is shown to be manipulatable either to simulate a 3-speed or a 4-speed transmission. This may be accomplished by shifting socket 128 appropriately between gear positions 130, 132, 134, 136 or 138 (FIGURE 4).

A multiple contact micro-switch is situated at each desired gear position to detect the accuracy or inaccuracy of driver's gear engagement manipulation of shift lever 120. FIGURE 4 further illustrates a simulated 3-speed transmission wherein four such micro-switches are utilized. These micro-switches are designated 140, 142, 144 and 146. Micro-switch 140 is shown in detail in FIGURE 3 and is mounted on bracket 148 by nut and bolt assemblies 150. Switch mounting bracket 148 is in turn fixed to cover plate 152 at 154 as, for example, by screws. Switch 140 is actuated by socket 128, tripping spring biased lever 156 as the operator positions socket 128 into gear position 130. If the driver accurately engages socket 128 into gear position 130, lever 156 will be displaced the maximum distance permissible toward the right. This displacement moves plastic actuator 160 to engage contacts 162 and 164. Contact 164 then moves screw 166 to engage contacts 168 and 170. Contact 170 subsequently moves screw 172 to engage contacts 174 and 176. As explained below, this causes recorder 16 to generate a trace indicating accurate placement of socket 128 in gear position 130. Should the driver inaccurately position socket 128 in gear position 130 so as to operatively move lever 156 only partially through its permissible range of movement, all of the contacts of switch 140 would not be engaged; and, consequently, a signal would be conveyed to recorder 16 which would cause the recorder to generate a trace indicative of faulty gear engagement.

Other types of multiple contact switches may be utilized in place of micro-switch 140, such as rotary dial type multiple contact switches.

Also, gear mechanisms 40 and 42 may be connected to appropriate sound reproduction equipment as shown diagrammatically in FIGURE 8 and explained in detail in applications 93,538 and 196,290, to produce an audible grinding sound effect to impress the gear engagement error upon the driver.

Manipulation of socket 128 to actuate any one of switches 140, 142, 144 and 146 is responsive to the action of gearshift lever 120, which is pivoted to a tapered disk 190 by a roll pin (not shown). Tapered disk 190 is carried in adapter 192 to form a ball and socket pivotal connection. Adapter 192, secured to cover 152 at 194, as by spot welding, has exterior threads to receive cap 196. Cap 196 is fixed to seat 198, as by welding, to form an assembly which is urged away from tapered disk 190 by spring 200. By this construction, cap 196 and seat 198 may be quickly unscrewed from adapter 192, permitting withdrawal also of lever 120, tapered disk 190 and spring 200 for purposes to be explained subsequently.

Cover plate 152 and integral adapter 192 may be removed from shift 42 for inspection or repair by removal of screws 202 and 203. Shift mechanism 42 is preferably mounted underneath the floor of vehicle 10 so that only shift lever 120, knob 122 and cap 196 with seat 198 are exposed to the view of the driver. Threaded apertures 204 are provided for mounting shift 42 to the floor of the vehicle 10. An added measure of support is provided by cover mounting bracket 206 which is joined with cover 152, as by welding.

In order to provide life-like gearshift environment, the assembly 210 of channels, plates and steel ball bearings illustrated in FIGURES 3 and 5 is provided. Plate, ball, and channel shift assembly 210 is enclosed along the upper portion thereof by cam plate 212 (which has a large circular aperture 214 best seen in FIGURE 4) screw mounted at 216 to side plate 218.

U-shaped cam plate 212 serves as an upper back-up plate for gear guide plate 220 and acts as a bearing surface for intermediate-sized steel balls 222, utilized as low friction bearing supports and spacing mechanisms to permit easy relative movement of the component parts of shift assembly 210. Gear guiding plate 220 (FIGURE 4) is fabricated to provide simulated neutral and 3-speed or 4-speed gearshift positions by the provision of gear position apertures 130-138 which may be stamped in the plate. Plate 220 is secured to plate 212, as by welding, is secured to cover 152 by screws 202, and is juxtaposed to the lower side plate 224.

The bottom of shift assembly 210 is enclosed by plate 230 and brackets 232, which are unitarily joined as by welding and may be removed as a unit by release of cap screws 234 to disassemble shift assembly 210. Bottom bracket 232 supports plate 230 and is a bearing surface for low friction small steel balls 236.

Intermediate the top enclosing members 212 and 220 and the bottom enclosing members 230 and 232 is a shiftable gear positioning assembly 240 composed of detent drive plate 242 and detent drive channel 244. As seen in FIGURE 3, drive plate 242 is spaced from top plate 220, bottom plate 230 and drive channel 244 by steel balls 222, 246 and 248. Balls 236 aid in maintaining drive channel 244 in spaced relation from plate 230.

Steel balls 222, 236, 246 and 248 may be appropriately lubricated so as to be revolvable without excessive friction as drive plate 242 and/or drive channel 244 are shifted with respect to the other component parts of shift assembly 210. Each of the steel balls is seated within an appropriately sized recess of the component parts of shift assembly 210 so as to be properly retained during operation.

As shown in FIGURE 4, socket 128 may be shifted up or down by the driver along the path representing the neutral range of shift 42 or may be shifted from left to right to place socket 128 in the desired gear position. Within the neutral range, as illustrated in FIGURE 5, plate 242 and channel 244 move as a unit from left to right. However, when manipulating socket 128 into and out of any desired gear position, channel 244 remains stationary and plate 242, integral with socket 128 at 249, moves relative to channel 244. Therefore, channel 244 travels solely in a substantially unidirectional planar path within the neutral range, and plate 242 moves substantially in a two directional planar path along with channel 244 in the neutral range and relative to channel 244 into and out of any desired gear position. In this way life-like simulation of gearshift maneuvers is provided and, at the same time, the mechanism used to accomplish this result is compact, has a long life—low maintenance expectancy, occupies only a small amount of space, and is economical to manufacture.

In order to rovide the driver with a life-like feeling of gear manipulation, a novel detent mechanism, which acts as a travel guide and gear position retaining means, has been provided in conjunction with drive plate 242 and drive channel 244. FIGURE 6 shows assembly 240, i.e., plate 242 and channel 244 and four peripheral detent mechanisms. Plate 242 is housed within channel 244 along sides 250 and 253, and is spaced slightly therefrom. Two sets, i.e., 251, 252 and 254, 255 of three detent recess positions each are provided along sides 250 and 253, respectively. Similarly, two sets, i.e., 257, 258 and 260, 261 of three detent recess positions each are provided along sides 256 and 259 of channel 244, respectively. Each set of the above mentioned sets of detent recess positions is provided with one juxtaposed steel ball. Steel balls 262, 263, 264, 266, 268, 270, 272 and 274 engage detent recess sets 251, 252, 254, 255, 257, 258, 260 and 261, respectively. Steel balls 262 and 263 of FIGURES 6 are held within apertures 280 and 282, respectively, of the left leg of channel 244 and are retained therein by rivet-secured yieldable spring 284 on the one side and by plate 242 on the other side. Similarly, steel balls 264 and 266 are housed within apertures 286 and 288, respectively, of the right leg of channel 244 and held therein by rivet-secured yieldable spring 290 on the one side and by plate 242 on the other side.

In like manner, steel balls 268 and 270 are situated within lower side plate apertures 292 and 294 and held there in by rivet-secured yieldable spring 296 on the one side and by channel 244 on the other side. Similarly, steel balls 272 and 274 are seated within lower side plate apertures 298 and 300 and are held therein on one side by yieldable spring 302 and on the other by channel 244.

The driver may manipulate lever 120 to shift within the neutral range, and between neutral and the gear positions. In the neutral range, drive plate 242 and drive channel 244 snap-move as a unit between any one of the three neutral positions represented by three detent recess positions of sets 257, 258, 260 and 261 so as to be adjacent gear positions 130-132, 134-136 or 138, as seen in phantom lines in FIGURE 6. FIGURE 6 shows shiftable assembly 240 in the neutral position adjacent gear positions 130-132. If it is desired to manipulate shiftable assembly 240 so as to position socket 128 in the neutral position adjacent reverse gear position 138, socket 128 is forced in a rightward direction, causing channel 244, at the middle detent recess position, to exert a force on balls 268, 270, 272 and 274 and drive them outwardly away from channel 244 against springs 296 and 302, respectively, causing springs 296 and 302 to yield, displacing the balls out of the middle recess position. This allows shiftable assembly 240 to move to the right, and to subsequently engage balls 268, 270, 272 and 274 in the left recess positions of sets 257, 258, 260 and 261 by means of the recoil force of springs 296 and 302. In this way the driver is realistically able to determine when the simulated gearshift mechanism is appropriately positioned in neutral adjacent any desired gear.

Once shiftable assembly 240 has been positioned in neutral adjacent the desired gear position, channel 244 remains stationary by the ball-detent recess and spring mechanisms associated with edges 256 and 258 of the channel. Thereafter, plate 242, as seen in FIGURE 6 may be either manipulated upwardly or downwardly into the gear position desired. For example, to simulate beginning forward movement of vehicle 10, plate 242, following depression of clutch pedal 26 of FIGURE 1, is manipulated relative to channel 244 in a downward direction, as viewed in FIGURE 6, engaging socket 128 in gear position 130. In consequence, the detent mechanisms associated with plate edges 250 and 253 operate in the same manner as the channel detent mechanisms already described. Hence, steel balls 262, 263, 264 and 266 are displaced out of the middle recess positions of sets 251, 252, 254 and 255 against yielding springs 284 and 290, and are subsequently repositioned in the top recess positions of these sets, respectively. Any desired shift between gears may be made in a like manner.

While a planar type simulated gearshift has been described with respect to shift mechanism 42, it is apparent that other types of simulated gearshift assemblies may be used in the floor of vehicle 10, as for example, a modified form of the rotatable motion assembly described in conjunction with shift mechanism 40.

It is apparent that both shift mechanisms 40 and 42 are optionally usable. When floor shift mechanism 42 is being utilized, shift lever 50 of FIGURE 2 is preferably removed to avoid driver confusion. In a similar manner, when shift mechanism 40 is being utilized, cap 196 of shift mechanism 40 of FIGURE 3 is unscrewed from adapter 192 and shift lever 120, with its associated taper disk 192, knob 122 and ball end 126, are all removed. Bolt and plate assembly 310, shown in FIGURE 7, is then placed on adapter 192 to form a plug extending downwardly through the central openings of shift 42 to bias actuator 312 of master switch S-23, as illustrated, opening the contacts of switch S-23. In this manner confusion and frustration of the driver being trained or evaluated is obviated.

FLOOR SHIFT MECHANISM OPERATION

The circuitry illustrated in FIGURE 8 is, in main part, identical to that shown in FIGURE 12 of application No. 196,290 and in application No. 93,538. The vehicle simulator disclosed in this application operates in the same manner as the simulator disclosed in the earlier applications with certain exceptions resulting from the employment of the novel convertible shift mechanism described above.

Referring now to FIGURE 8, simulated vehicle 10 is connected to an alternating current power source 200 by leads L-202 and L-204 which are connected to the input terminals of a full wave rectifier CR1-CR4. When the rectifier is energized, operating voltage is supplied from the positive rectifier output terminal through L-206, the solenoid of relay K-208, and lead L-210 to one terminal of switch S-23. The other side of switch S-23 is connected through lead L-212 to the negative output terminal of rectifier CR1-CR4. Consequently, if switch S-23 is closed, relay K-208 will be energized.

As explained above, when simulation of a column shift is desired, the floor shift mechanism 42 is removed and assembly 310 is assembled on adapter 192 (see FIGURE 7), holding the contacts of switch S-23 open. With switch S-23 contacts open, relay K-208 remains de-energized and the simulated vehicle operation is as described in applicants Nos. 196,290 and 93,538.

If simulation of a floor shift is desired, assembly 310 is removed, floor shift mechanism 42 is assembled, the contacts of switch S-23 close, and relay K-208 is energized through the circuit described above. Energization of relay K-208 causes the relay to transfer its contacts. This has only one significant effect on the simulator operation. The connections to the column shift described in application No. 93,538 are interrupted and similar connections are made to the floor shift. Consequently, the operational sequence will be as described in the above application except that the operational sequence will be controlled by the floor shift.

As discussed above in conjunction with the mechanical aspects of the floor shift mechanism, the simulated floor shift mechanism is designed to test the operator's ability to shift gears accurately when the occasion demands.

Referring again to FIGURE 8, each of the floor shift mechanism microswitches (only S-140 is shown) has three sets of normally open contacts, in this case 162, 164; 168, 170; and 174, 176.

In a typical test situation, the simulated vehicle will be stopped, shift mechanism 42 will be in neutral, and instructions will be flashed on screen 14 for the simulator operator to shift into low gear and proceed straight ahead. In response, the operator should depress the simulated clutch pedal 26, move gearshift lever 120 to the "low" position, and then simultaneously release the clutch and press on the accelerator. As discussed above in conjunction with the mechanical description of gearshift mechanism 42, if the gearshift lever is properly manipulated in this sequence of movements, the three sets of contacts of switch S-140 will be closed.

In this circumstance, a circuit will be completed from lead L-212 through switch contacts 168 and 170, lead L-216, contact 4 of relay K-208, lead L-218, a switch S-220 in the accelerator circuitry, lead L-222, contact 2 in relay K-208, lead L-224, microswitch contacts 174 and 176, lead L-226, lead L-228, switch S-230 in the simulated clutch circuitry, and lead L-232 to the grounded simulated speedometer circuitry. Completion of this circuit will effect operation of the speedometer in the manner described in application No. 93,538. Parallel circuits are simultaneously completed through leads L-234 to audio amplifier 236 and to the "speed" input terminals in recorder 16. As a result, speedometer 32 (see FIGURE 1) will indicate increasing speed of the accelerated vehicle, a trace indicative of increasing speed will be recorded in the speed column of the strip chart 240 passing through recorder 16, and the sound of an accelerating vehicle will issue from speaker 242 (see FIGURE 8A) which is connected by circuitry (not shown) to audio amplifier 236.

If gearshift 120 is moved in an improper manner in the above-described sequence, the contacts of the microswitch S-140 at the "low" position will not be closed. In this circumstance, the above-described circuits will not be completed, the indicator of speedometer 32 will remain at zero, the expected sound of an accelerating automobile will not be heard, and a speed of "0" miles per hour will be recorded in the speed column of strip chart 240, providing an indication of the improper gearshift manipulation.

The remaining contacts, 162 and 164, of microswitch S-140, are employed in the operation of the accelerator in speedometer circuitry and, as far as the present invention is concerned, are not part of it. Since the functioning of this circuitry is disclosed, and claimed in the earlier applications referred to above, a detailed and repetitious discussion of the same herein is not deemed necessary.

The remaining microswitches 142, 144 and 146 function in substantially the same manner as the microswitch S-140 discussed above. It is to be understood, therefore, that the foregoing discussion is equally applicable to these microswitches.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An automotive wheeled vehicle simulator for driver training and evaluation, including at least two separately located, optionally operable, simulated gearshift devices; one of said gearshift devices being positioned on the floor of said simulator and comprising shift means; means responsive to said shift means including force receiving transmitting means, substantially two-directional planar travelling means, and substantially unidirectional planar travelling means whereby movement within neutral and between respective gear positions may be accurately simulated; and recording means and electrical means having multiple contact switches, one at each similated gear position, to detect accurate or faulty gear shifting engagement and means interconnecting said switches with said recording means whereby a record of the driver gear manipulation is produced.

2. The device of claim 1, wherein said shift means is releasable and adapted to be replaced by plug means whereby the driver is not confused by the plurality of gear shift devices, and whereby said means interconnecting said switches with said recording means, is rendered inoperative when said gear device is not used.

3. An automotive wheeled vehicle simulator for driver training and evaluation, including at least two separately located optionally operable, simulated gearshift devices; one said gearshift device being positioned on the floor of said simulator and comprising shift means, means responsive to said shift means including force receiving and transmitting means, substantially two-directional planar travelling means, and substantially unidirectional planar travelling means whereby movement within neutral and between respective gear positions may be accurately simulated; wherein
    said unidirectional travelling means is a drive channel and said two-directional travelling means is a drive plate supported within said drive channel and including low friction support means, and travel guiding and gear position retaining means whereby both said drive channel and said drive plate move unitarily within neutral and said drive plate moves relative to said drive channel into and out of gear positions.

4. The device of claim 3, wherein said low-friction supporting means is a plurality of bearings, and wherein said travel guiding and gear position retaining means includes two-directional detent means whereby said drive plate may be restrained in the neutral position adjacent to the desired gear position or restrained within the desired gear position.

5. The device of claim 4, including housing means and wherein said detent means includes recess means associated with said housing means, said drive channel, said drive plate, said low-friction recess-engaging means, and said yieldable spring means.

6. In an automotive wheeled vehicle simulator system having a screen and projection means for displaying a continuous traffic scene before the driver at controllable speeds, electrical means responsive to the driver's manipulation, recording means responsive to said electrical means for producing a permanent continuous record of the driver's manipulation: a wheeled vehicle simulator for driver training and evaluation having a steering column and a floor and including first and second optionally operable simulated gearshift devices having means for rendering inoperative the gearshift device not being utilized, said first gearshift device having:
    (a) electrical means responsive to gear manipulation comprising:
        (1) a sensing device for detecting accurate or faulty gear engagements; and
        (2) means interconnecting said sensing device with said recording means;
    (b) means operable by the driver comprising:
        (1) shift means including an operable shaft,
        (2) linkage means,
        (3) means substantially rotatably manipulatable responsive to said shaft and said linkage means to position the device in the desired simulated position; and
    (c) steering column mounting means positioning said means operable by the driver;
said second gearshift device having:
    (a) an electrical said second gearshift device having means responsive to gear manipulation comprising:
        (1) a sequentially operable multiple contact switch at each simulated gear position for detecting accurate or faulty gear engagements,
        (2) means interconnecting each said switch with said recording means, and
        (3) master switch means actuable for deactivating said electrical means during use of said first gearshift device;
    (b) means operable by the driver comprising:
        (1) releasable shift means including a gear engaging shaft adapted to be replaced by plug means whereby the driver is not confused by the plurality of gearshift devices when utilizing said first gearshift device and whereby said master switch is actuated,
        (2) socket means receiving one end of said shaft and operatively responsive thereto,
        (3) substantially two-directional travelling drive channel,
        (4) a substantially unidirectional planar travelling drive plate supported within said drive channel,
        (5) housing means at least partially enclosing said second gearshift device,
        (6) low friction support bearings for supporting said drive channel and said drive plate within said housing means,
        (7) two directional travel guiding and gear position retaining detent means having:
            (a) co-acting recess means associated with said housing means, with said drive channel and with said drive plate,
            (b) low-friction recess engaging means, and
            (c) yieldable spring means; whereby both said drive channel and said drive plate move unitarily within neutral and said drive plate moves relative to said drive channel into and out of any gear position and whereby said drive plate may be restrained in neutral position adjacent the desired gear position or restrained within the desired position; and
        (d) floor mounting means to position said second gearshift device.

7. In a vehicle operation simulator:
    (a) a simulated vehicle;
    (b) a pair of simulated gearshift devices each having at least one component alternately installable in said vehicle to simulate floor and column mounted gearshifts, respectively;
    (c) circuit means including at least one electrically operated device and an independent switching means associated with and operated by manipulation of each of said simulated gearshifts for activating said device;
    (d) relay means operable when de-energized and energized, respectively, to operably connect one or the other of said switching means to said device; and
    (e) means installable in said vehicle coincident with the removal of one of said simulated gearshifts for preventing energization of said relay.

8. The vehicle operation simulator as defined in claim 7 wherein:
   (a) one of said gearshift devices is a simulated manual gearshift; and
   (b) the associated switching means includes a plurality of switches each operable by proper shifting movement of said gearshift to a position in the simulated gate.

References Cited
UNITED STATES PATENTS 2,870,548  1/1959  Chedister _____ 35—11
1,723,744  8/1929  McKenna _____ 35—11

EUGENE R. CAPOZIO, Primary Examiner

W. W. NIELSEN, Assistant Examiner